(12) United States Patent
Kurihara et al.

(10) Patent No.: US 7,274,424 B1
(45) Date of Patent: Sep. 25, 2007

(54) TOUCH SENSOR TYPE LIQUID CRYSTAL DISPLAY HAVING A PLURALITY OF SPACERS, EACH COMPRISING TWO MEMBERS ADAPTED TO SLIDE RELATIVE TO EACH OTHER IN RESPONSE TO A CONTACT FORCE

(75) Inventors: Mikio Kurihara, Yamato-shi (JP); Eisuke Kanzaki, Fujisawa-shi (JP)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/634,312

(22) Filed: Aug. 8, 2000

(30) Foreign Application Priority Data

Aug. 27, 1999 (JP) ............................. 11-241322

(51) Int. Cl.
*G02F 1/1339* (2006.01)

(52) U.S. Cl. .................... 349/155; 349/12; 349/156; 345/173

(58) Field of Classification Search ............ 349/155, 349/12, 156, 106, 158; 345/173
See application file for complete search history.

(56) References Cited

U.S. PATENT DOCUMENTS

| | | | | |
|---|---|---|---|---|
| 5,499,128 A | * | 3/1996 | Hasegawa et al. | 349/155 |
| 5,852,487 A | * | 12/1998 | Fujimori et al. | 349/162 |
| 6,331,881 B1 | * | 12/2001 | Hatano et al. | 349/86 |
| 6,339,462 B1 | * | 1/2002 | Kishimoto et al. | 349/156 |

FOREIGN PATENT DOCUMENTS

JP    2000-227596    *   8/2000

* cited by examiner

*Primary Examiner*—Thoi V. Doung
(74) *Attorney, Agent, or Firm*—F. Chau & Associates, LLC (57) ABSTRACT

A touch sensor type liquid crystal display is disclosed to provide a touch sensor type liquid crystal display which can endure long-time use while achieving a weight reduction. The touch sensor type liquid crystal display includes: a liquid crystal display panel 2 having an array substrate 14 and a color filter substrate 13, which are arranged oppositely to each other by interpolating a liquid crystal layer 18; and a touch sensor panel 3 having a movable electrode plate 4 and a fixed electrode plate 5, which are arranged oppositely to each other by a specified gap. These panels 2 and 3 are laminated together. A gap controlling spacer 19 is fixed in the array substrate 14 to restrict a spacer movement in a planar direction.

16 Claims, 11 Drawing Sheets

☐ : POSITIONS OF ARRANGING SPACERS 19

○ : POSITIONS OF ARRANGING SPACERS 19

○ : POSITIONS OF ARRANGING SPACERS 19

□ : POSITIONS OF ARRANGING SPACERS 19

FIG. 13

-- PRIOR ART --

TOUCH SENSOR TYPE LIQUID CRYSTAL DISPLAY HAVING A PLURALITY OF SPACERS, EACH COMPRISING TWO MEMBERS ADAPTED TO SLIDE RELATIVE TO EACH OTHER IN RESPONSE TO A CONTACT FORCE

BACKGROUND OF THE INVENTION

1. Field of the Invention

The present invention relates to a touch sensor type liquid crystal display equipped with a touch sensor function on a liquid crystal display panel, and more particularly to a liquid crystal display with a resistive membrane touch sensor.

2. Description of the Related Art

Figure 13:
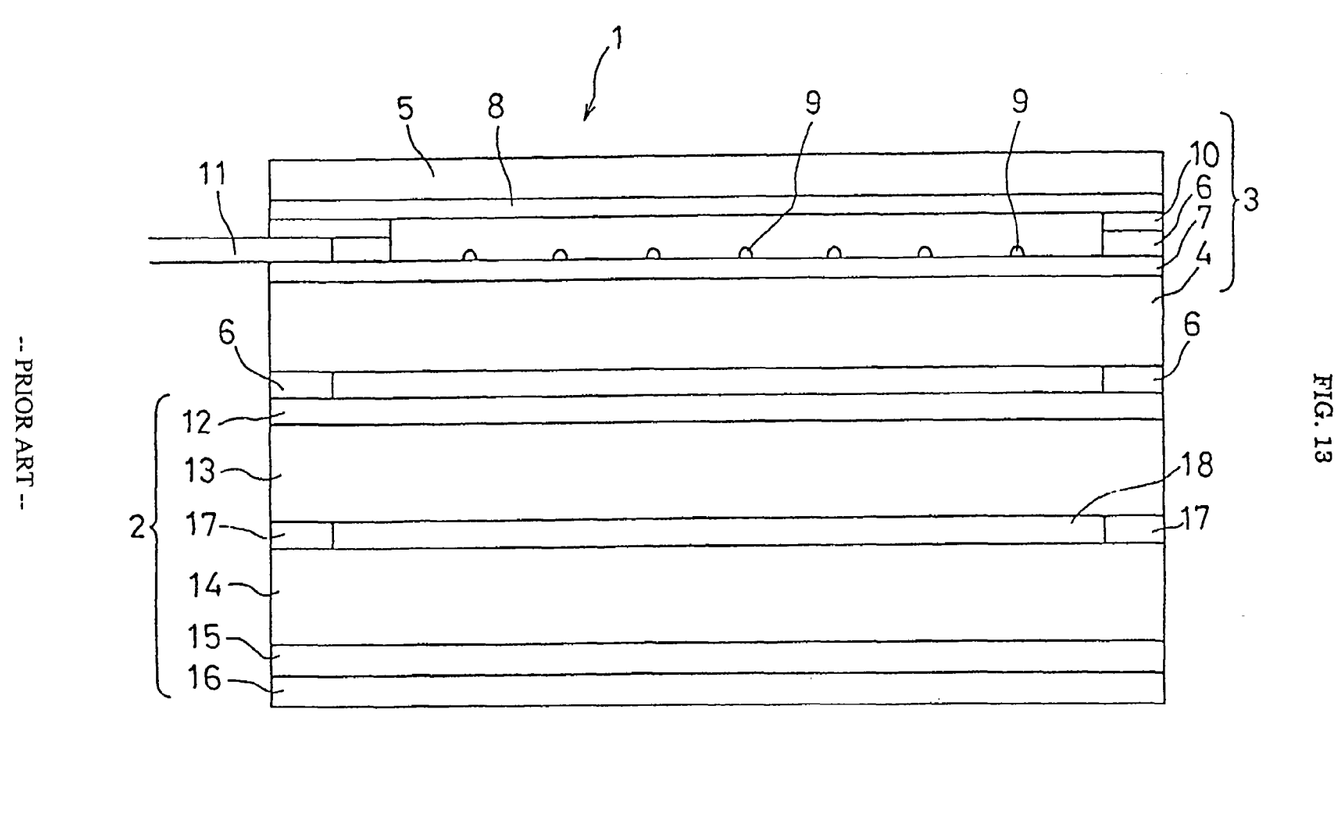
FIG. 13 is a constitutional view showing in section a conventional touch sensor type liquid crystal display.

Resistive touch membrane sensors are employed to provide a way to input or select information displayed on a display device. Referring to FIG. 13, an example of a conventional resistive membrane touch sensor type liquid crystal display is shown, which was disclosed in Japanese Patent Laid-Open Hei 7 (1995)-84705. In the present specification, a touch sensor type liquid crystal display means one having a touch sensor function added to a liquid crystal display panel, whatever mode may be employed.

As shown in FIG. 13, this touch sensor type liquid crystal display 1 includes a touch sensor panel 3 laminated on a liquid crystal display panel 2. The liquid crystal display panel 2 has a structure, which is made by laminating an upper polarizing plate 12, a color filter substrate 13 made of glass, an array substrate 14 made of glass, a lower polarizing plate 15 and a backlight unit 16 from the upper part of the drawing. Peripheral parts of the color filter substrate 13 and the array substrate 14 are sealed with a sealing material 17, and a liquid crystal material is sealed in a space to form a liquid crystal layer 18. Though not shown in FIG. 13, the liquid crystal layer 18 includes spacers for controlling a gap between the color filter substrate 13 and the array substrate 14: typically, a number of spherical members called beads are dispersed in the pixel region. Various improvements have been made for spherical spacers. For example, Japanese Patent Laid-Open Hei 5(1993)-80343 disclosed spherical spacers, which are capable of reducing non-uniformity of the gap and are not foamed at a low temperature.

The touch sensor panel 3 is laminated on the liquid crystal display panel 2 by an adhesive tape 6. The touch sensor panel 3 includes a fixed electrode plate 4 made of glass, and a movable electrode plate 5 made of glass and arranged opposite the fixed electrode plate 4 at a specified interval by using the adhesive tape 6. The fixed electrode plate 4 includes a transparent conductive film 7 made of ITO (indium tin oxide), $SnO_2$ or the like formed on the surface, and the movable electrode plate 5 includes a similar transparent conductive film 8. Grids 9 are disposed between the fixed and movable electrode plates 4 and 5 to prevent unexpected contact therebetween.

In both ends of the fixed and movable electrode plates 4 and 5, electrode terminals 10 are pasted by silver or the like in directions orthogonal to each other. Wires of the electrode terminals 10 formed on the fixed and movable electrode plates 4 and 5 are collected at one place and connected to a flexible substrate 11.

The touch sensor type liquid crystal display became popular remarkably fast. Now, these type of displays can be seen in many places, for example, bank ATMs, ticket machines at train stations, and so on. Use of the touch sensor type liquid crystal display is not limited to the installed type equipment such as ATM or the like, but application thereof has expanded to a portable or mobile equipment.

One of the tasks regarding the mobile equipment is a reduction in weight. This task is also required for the touch sensor type liquid crystal display. One problem for the weight reduction has been the use of a glass substrate, which forms a touch sensor panel.

At present, a mainstream type of the touch sensor panel 3 is one, which includes the fixed electrode plate 4 made of glass, and the movable electrode plate 5 made of a plastic film such as PET (polyethylene terephthalate) or the like. However, even for the type having the movable electrode plate 5 made of a plastic film, a sufficient reduction cannot be made in weight because the fixed electrode plate 4 is made of glass. Consequently, although there are latent demands for fixing the touch sensor panel in a notebook personal computer using, for instance, a liquid crystal display panel of 13.3 type, practical use thereof has not yet been realized.

As a lighter and thinner touch sensor panel, types having both fixed and movable electrode plates made of plastic films have been known. Widely used among these types is one having a thickness of the plastic film set in a range of 10 µm to 3 mm, especially in a range of 100 µm to 500 µm. However, it has been pointed out that the touch sensor type liquid crystal display constructed by laminating the touch sensor panel of this type on the liquid crystal display panel cannot endure long-time use. This is because low rigidity of the touch sensor panel causes a pressing force at the time of touching to be applied to the liquid crystal display panel, and an image characteristic thereof is adversely affected.

The touch sensor type liquid crystal display described in above-mentioned Japanese Patent Laid-Open Hei 7 (1995)-84705 is constructed by eliminating the fixed electrode plate of the touch sensor panel, and providing the function thereof using the color filer substrate of the liquid crystal display panel instead. In the case of this touch sensor type liquid crystal display, a problem similar to the above may occur if the movable electrode plate is made of a plastic film.

It is an object of the present invention to provide a touch sensor type liquid crystal display, which can endure long-time use is reduced in weight. It is another object of the invention to provide a liquid crystal display panel suitable for used as a touch sensor type liquid crystal display.

SUMMARY OF THE INVENTION

To achieve a satisfactory weight reduction, the inventors used a type of display which does not use a glass substrate for a touch sensor panel, and investigated prevention of deterioration of an image characteristic of a liquid crystal display panel. As a result, the inventors discovered that it was effective to improve spacers in the liquid crystal layer of the liquid crystal display panel. Specifically, since the spacers used in the conventional liquid crystal display panel are spherical, contact between the color filter substrate and the array substrate sandwiching the spacers and the liquid crystal layer provides point-contacts. This point-contact increases contact pressure. Also, because of the structure permitting movement of the spacers in the liquid crystal layer, the display electrode formed on the surface of the color filter substrate (or the array substrate) and the orientation film formed on the surface of the display electrode can be damaged. Consequently, an image characteristic is deteriorated.

Thus, it is a task of the present invention to restrict spacer movement in a planar direction of the liquid crystal display panel. It is another task of the invention to set contact between a glass substrate constituting the liquid crystal display panel and the spacers to be surface-contact by forming the spacer in a columnar shape.

The foregoing task may be achieved by providing a touch sensor type liquid crystal display, which comprises: a liquid crystal display panel having first and second substrates arranged oppositely to each other distanced by a specified gap; gap controlling spacers, each of the spacers restricting a width of the gap and a spacer movement in a planar direction; and a touch sensor added to the liquid crystal display panel including fixed and movable electrode plates.

A method for restricting movement of the spacers in the planar direction of the liquid crystal display panel, includes use of PEP (Photo Engraving Process). A specific process will be described later, but restriction of the movement can be realized by forming a columnar spacer on a color filter substrate or an array substrate facing a liquid crystal layer by means of PEP. In this case, the spacer is fixed to the color filter substrate or the array substrate, and restricted in its movement in the planar direction of the liquid crystal display panel. Instead of being directly formed on the color filter substrate or the array substrate, the spacer may be formed on a thin film, which is formed on the color filter substrate or the array substrate.

According to the present invention, the liquid crystal display panel and the touch sensor should not be included in the constitutional limitations of the spacer, and a conventionally known constitution can be employed for each. However, the prior art or later-described embodiments of the present invention should not place any constitutional limitations, and the constitution thereof is also applicable to improved technologies.

The gap controlling spacer of the present invention should preferably be formed in a columnar shape. This is because the columnar shape of the spacer causes contact with the color filter substrate or the array substrate to be a surface-contact, and a pressing force can be reduced more compared with the conventional spherical spacer based on point-contact. It should be noted that the effectiveness of the columnar shape is not limited to the case where the movement of the gap controlling spacer is restricted in the planar direction of the liquid crystal display panel. But, the columnar shape of the spacer is only an example of causing contact with the color filter substrate or the array substrate to be a surface-contact, and other shapes causing surface-contact can also be used.

The gap controlling spacers of the present invention can be arranged regularly in the planar direction of the liquid crystal display panel. Specifically, the spacer can be formed in a predetermined position in the planar direction of the liquid crystal display panel by using the aforementioned PEP. This means that the spacers can be arranged regularly in the planar direction according to various needs of the liquid crystal display panel. The conventional spherical spacers were dispersed between the color filter substrate and the array substrate and, thereafter, it was impossible to control positioning thereof in the planar direction of the liquid crystal display panel. According to the present invention, however, positions of the spacers can be controlled, and the spacers can be arranged regularly.

The regular arrangement of the spacers is advantageous in various respects for the touch sensor type liquid crystal display. For example, arrangement of the spacers keeps constant the amount of bending caused by touching the touch sensor panel in any position in the planar direction of the liquid crystal display panel. Accordingly, uneven bending of the liquid crystal display panel can be prevented.

According to the present invention, the regular arrangement of the gap controlling spacers in the planar direction of the liquid crystal display panel means not only a uniform arranging density but also a non-uniform arranging density may be provided. In other words, the number of times of touching is different from position to position on the surface of the touch sensor panel. For example, the number of times a region A is touched may be larger than that of a region B. Thus, it is effective to set an arranging density of the spacers according to the number of times a region may be touched. For example, by increasing a density of spacers in an often-touched region, the satisfactory function of the spacers in this region can be guaranteed.

According to the invention, it is also effective to set an arranging density of the gap controlling spacers in proportion to a bending amount of the touch sensor panel. In other words, when the same pressing force is applied, a bending amount is increased in the center of the touch sensor panel, and a bending amount of the liquid crystal display panel located below the touch sensor panel is accordingly larger in the center, assuming that no spacers are present in the touch sensor panel. Thus, in this case, it is only necessary to set an arranging density of the gap controlling spacers to be high in the center of the liquid crystal display panel. However, setting of the arranging density of the gap controlling spacers in proportion to the bending amount of the touch sensor panel should not be construed as limited to only setting the arranging density in the center high.

One embodiment of the touch sensor type liquid crystal display of the present invention may include a liquid crystal display panel having array and color filter substrates arranged oppositely to each other by interpolating a liquid crystal layer; and a touch sensor panel having movable and fixed electrode plates arranged oppositely to each other by a specified gap, these panels being laminated together. The touch sensor type liquid crystal display of this type is constructed by preparing the liquid crystal display panel and the touch sensor panel which function independently of each other, and laminating these to be united.

Other than the foregoing type, the touch sensor type liquid crystal display of the present invention may be one comprising: a liquid crystal display panel having array and color filter substrates arranged oppositely to each other by interpolating a liquid crystal layer; a movable electrode plate serving as a touch sensor arranged oppositely to the color filter substrate by a specified gap; and a conductive film serving as a touch sensor formed on a surface opposite the movable electrode plate of the color filter substrate. This touch sensor type liquid crystal display is constructed by eliminating the fixed electrode plate serving as a touch sensor, and providing this function for the color filter substrate of the liquid crystal display panel instead. Thus, this type is effective for reducing a thickness and weight of the touch sensor type liquid crystal display.

According to the present invention, the touch sensor added to the liquid crystal display panel is inclusive of any modes: not only lamination of the liquid crystal display panel and the touch sensor panel which function independently of each other and formation of the conductive film serving as the touch sensor by using the color filter substrate of the liquid crystal display panel, but also the addition of the function as the touch sensor to the liquid crystal display panel.

Regarding a position of the gap controlling spacer of the invention, consideration should preferably be given to a relationship with a position of the grid located in the touch sensor so as to prevent the pressing of touching from adversely affecting the liquid crystal display panel. For example, since a pressing force generated by touching the touch sensor surface is received by the grid, by setting a position of the grid to be coincident with that of the gap controlling spacer, it is possible to reduce bending of the liquid crystal display panel caused by application of the pressing force on the gap controlling spacer.

For the grid, Japanese Patent Laid-Open Hei 9 (1997)-293429 disclosed a grid condition capable of preventing entry breaking even when touching is made by a low load. This condition can also be employed.

The spacer of the present invention may be arranged in a black matrix region of the liquid crystal display panel. The black matrix is a region, which does not give any direct effects on image display. Accordingly, even if the black matrix is damaged, influence given to an image characteristic will be smaller compared with the case where damage occurs in the image display region.

A manufacturing method suited for the touch sensor type liquid crystal display of the present invention comprises: a step of coating a photosensitive resin on a color filter substrate, performing ultraviolet-ray exposure by using a photomask to cure the resin and removing an uncured portion to form a gap controlling spacer on the color filter substrate; a sealing material coating step of coating a sealing material like a frame in a peripheral part of the color filter substrate or an array substrate; an adhering step for adhering the other substrate to the color filter substrate or the array substrate coated with the coating material in the sealing material coating step with a specified gap by applying pressure to the same; a liquid crystal injecting step for injecting a liquid crystal material in the gap between the two substrates adhered to each other in the adhering step; and a step of laminating together a liquid crystal display panel obtained by the above steps and a touch sensor panel. This manufacturing method is characterized in that formation of the gap controlling spacer is carried out by PEP, and a method available in the prior art can be employed for a specific content of this step. The spacers can also be formed on the array substrate, or on both. Furthermore, for the touch sensor, other than the lamination of the separately prepared touch sensor panel, a conductive film can be formed as a touch sensor on the color filter substrate of the liquid crystal display panel, and a movable electrode plate can be arranged as a touch sensor oppositely to a surface having the conductive film formed thereon.

Regarding the columnar spacer, the prior art is presented in Japanese Patent Publication Hei 7(1995)-50273 and Japanese Patent Laid-Open Hei 3(1991)-15824, each of which discloses the use of the spacers for liquid crystal display panel alone. However, these do not disclose a possibility of using the spacers in combination with the touch sensor, and did not point out the problem of image characteristic deterioration caused by the conventional spherical spacer when the liquid crystal display was used in combination with the touch sensor.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
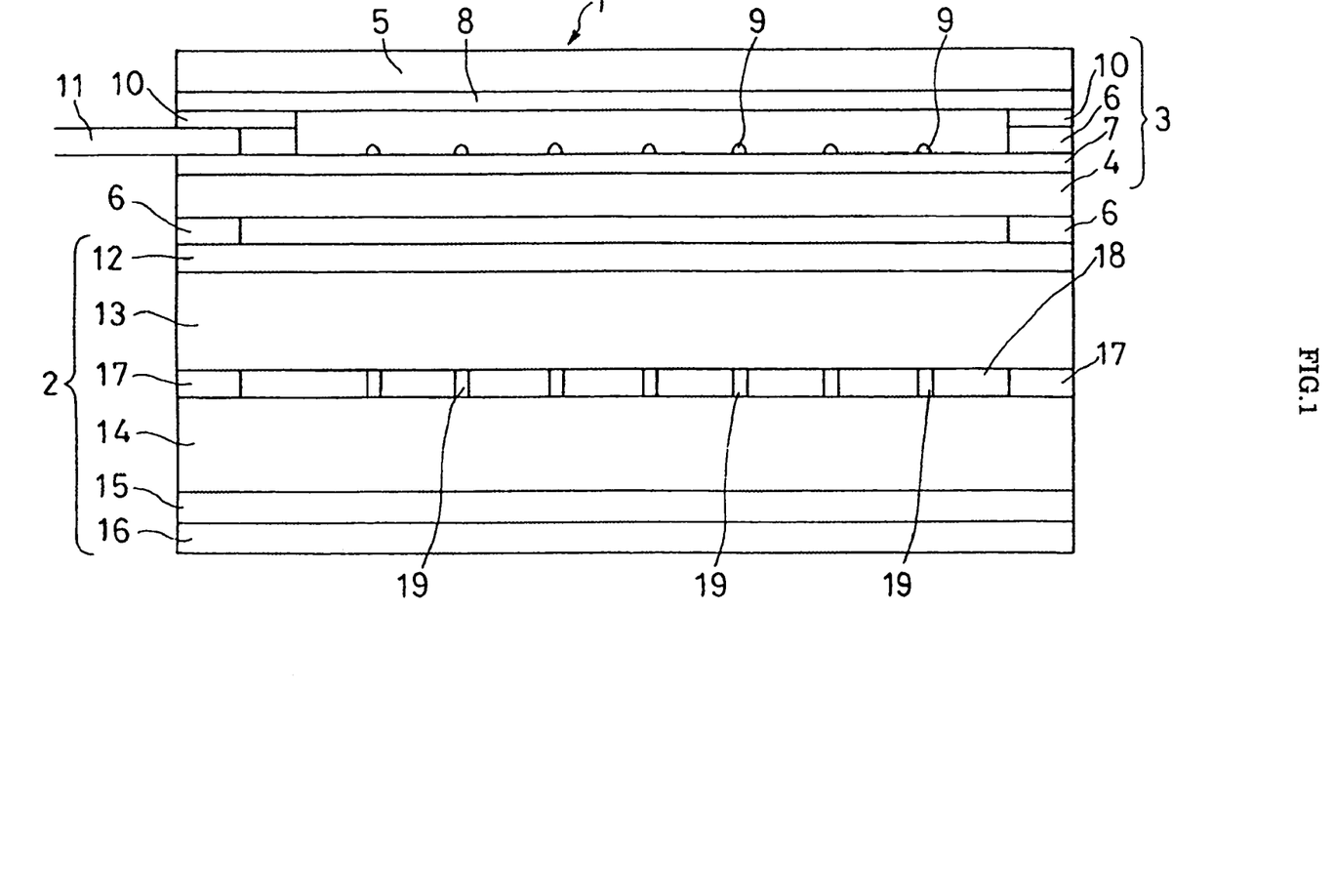
FIG. 1 is a cross-sectional view showing a touch sensor type liquid crystal display according to a first embodiment of the present invention.
Figure 2:
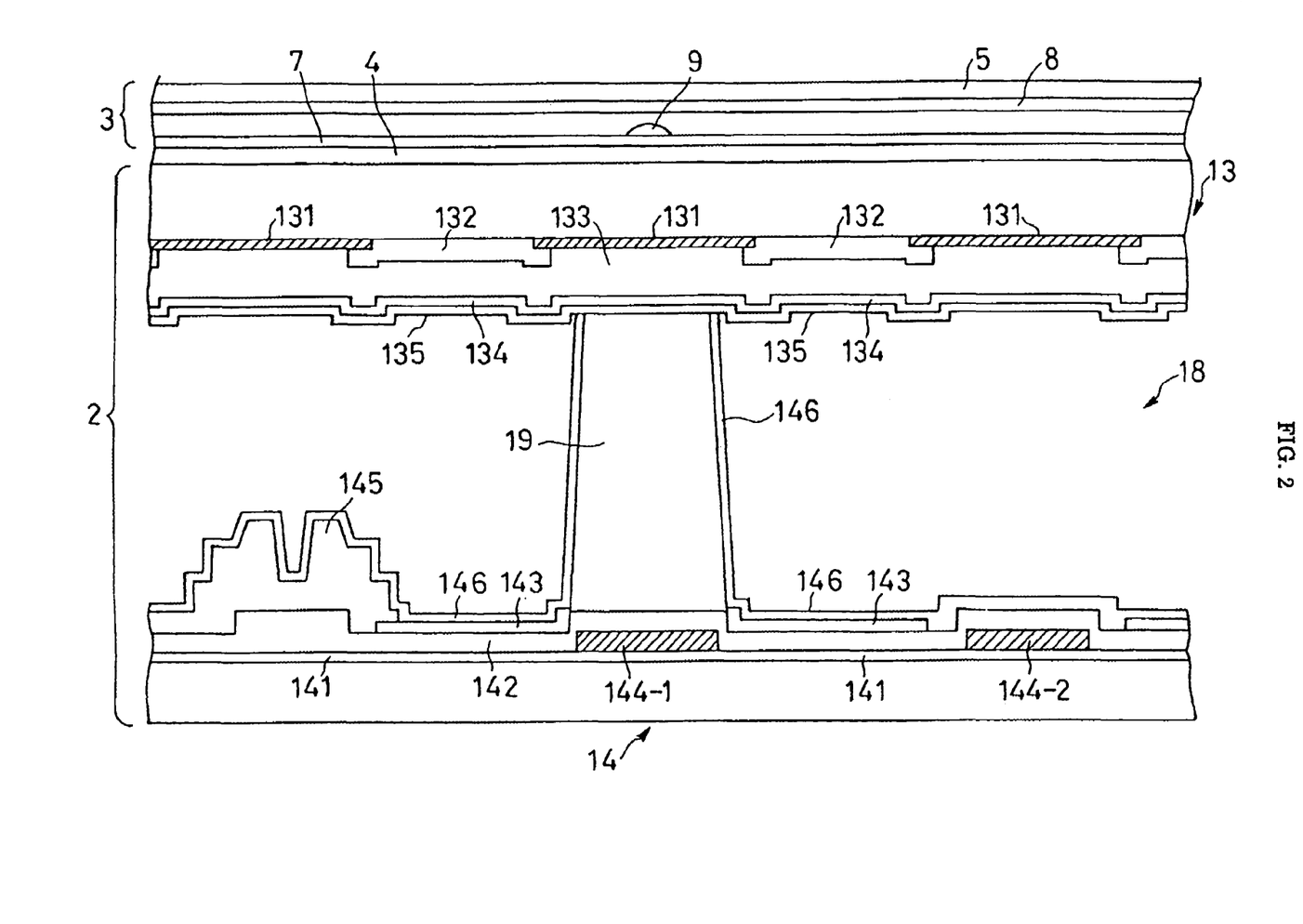
FIG. 2 is a detailed sectional view showing the touch sensor type liquid crystal display of the first embodiment.
Figure 3:
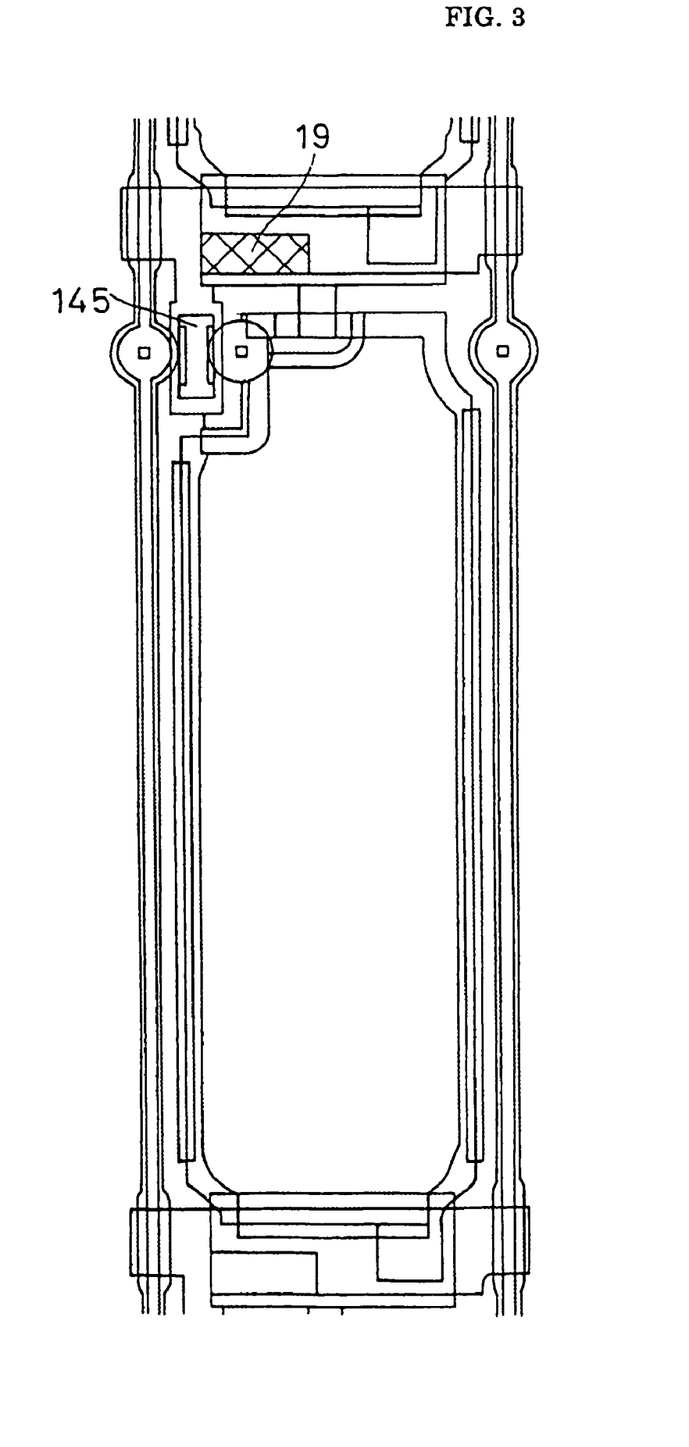
FIG. 3 is a view illustrating an arrangement of a gap controlling spacer for a single pixel according to the first embodiment.
Figure 4:
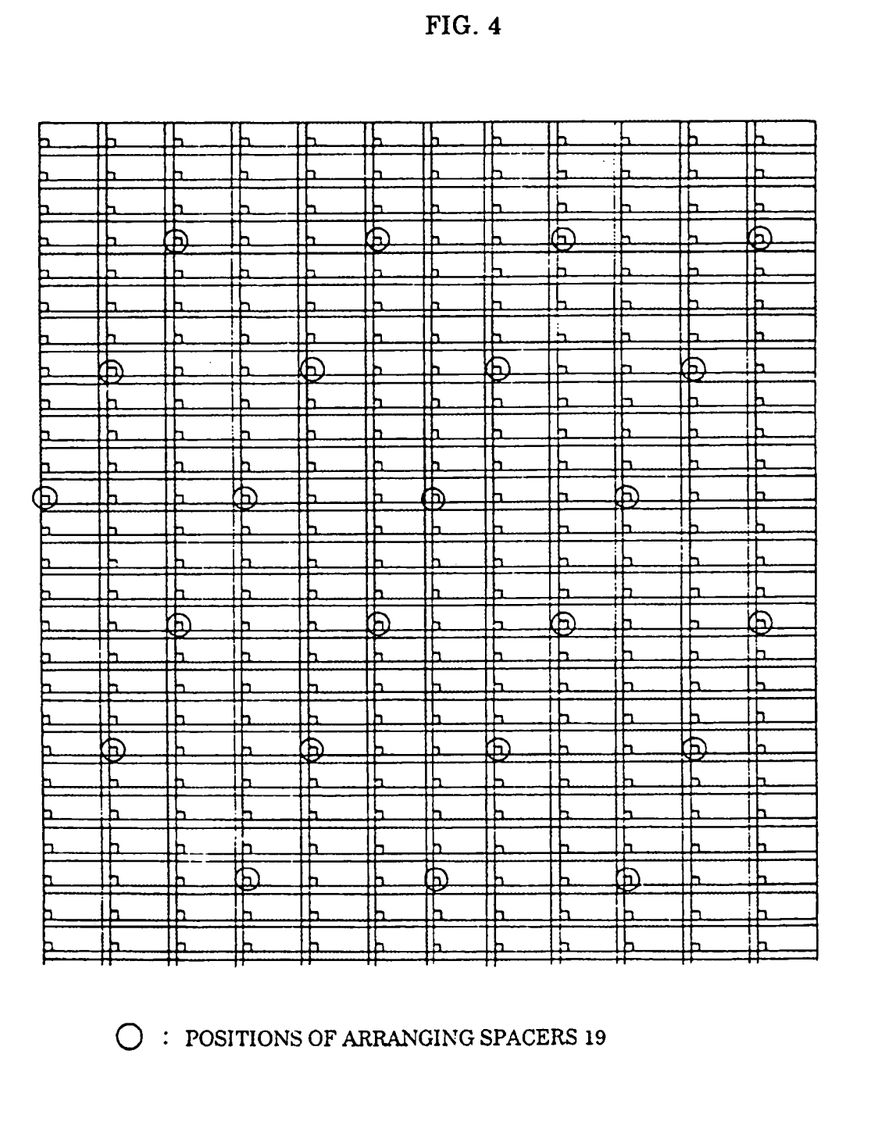
FIG. 4 is a view illustrating an arrangement of the gap controlling spacer in a liquid crystal display panel according to the first embodiment.
Figure 5:
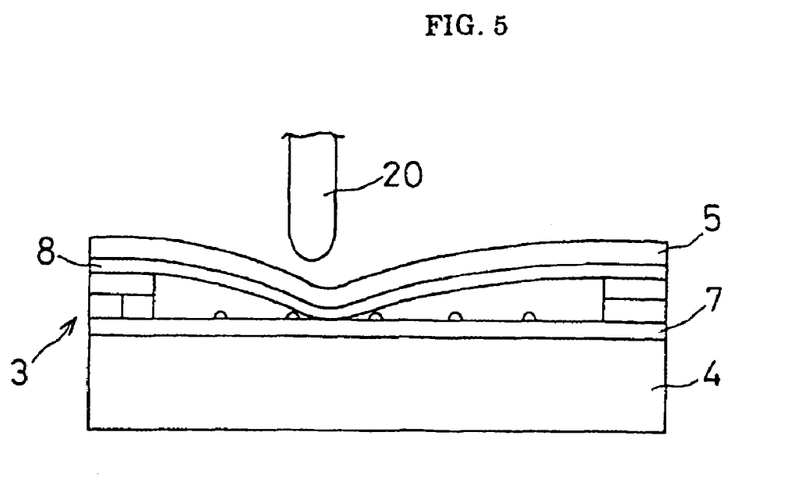
FIG. 5 is a sectional view showing a state of touching a touch sensor panel.
Figure 6:
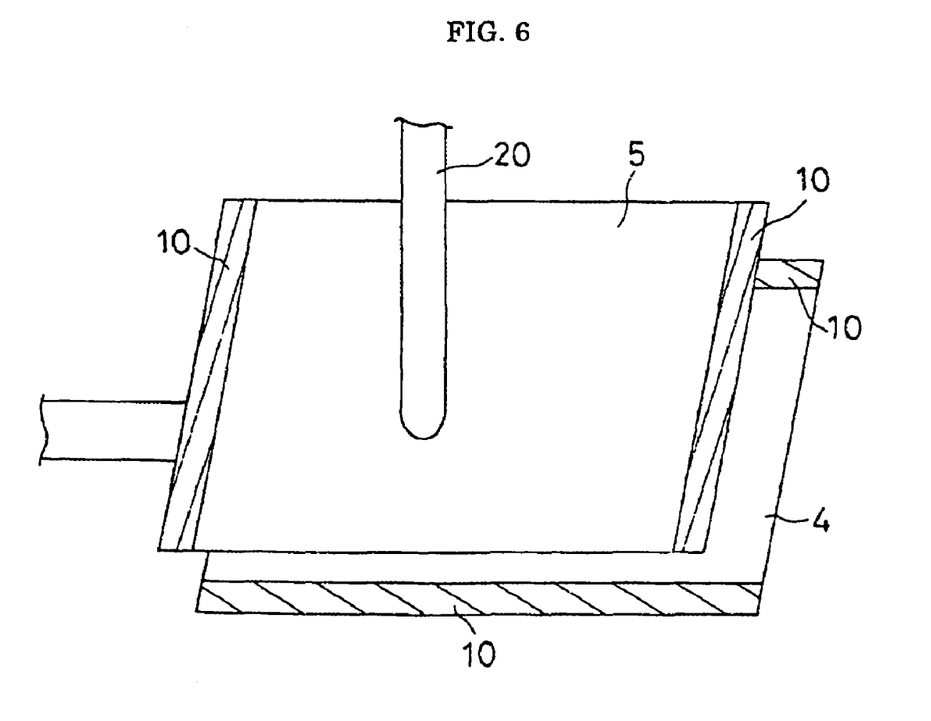
FIG. 6 is a perspective view showing a constitution of the touch sensor panel.
Figure 7:
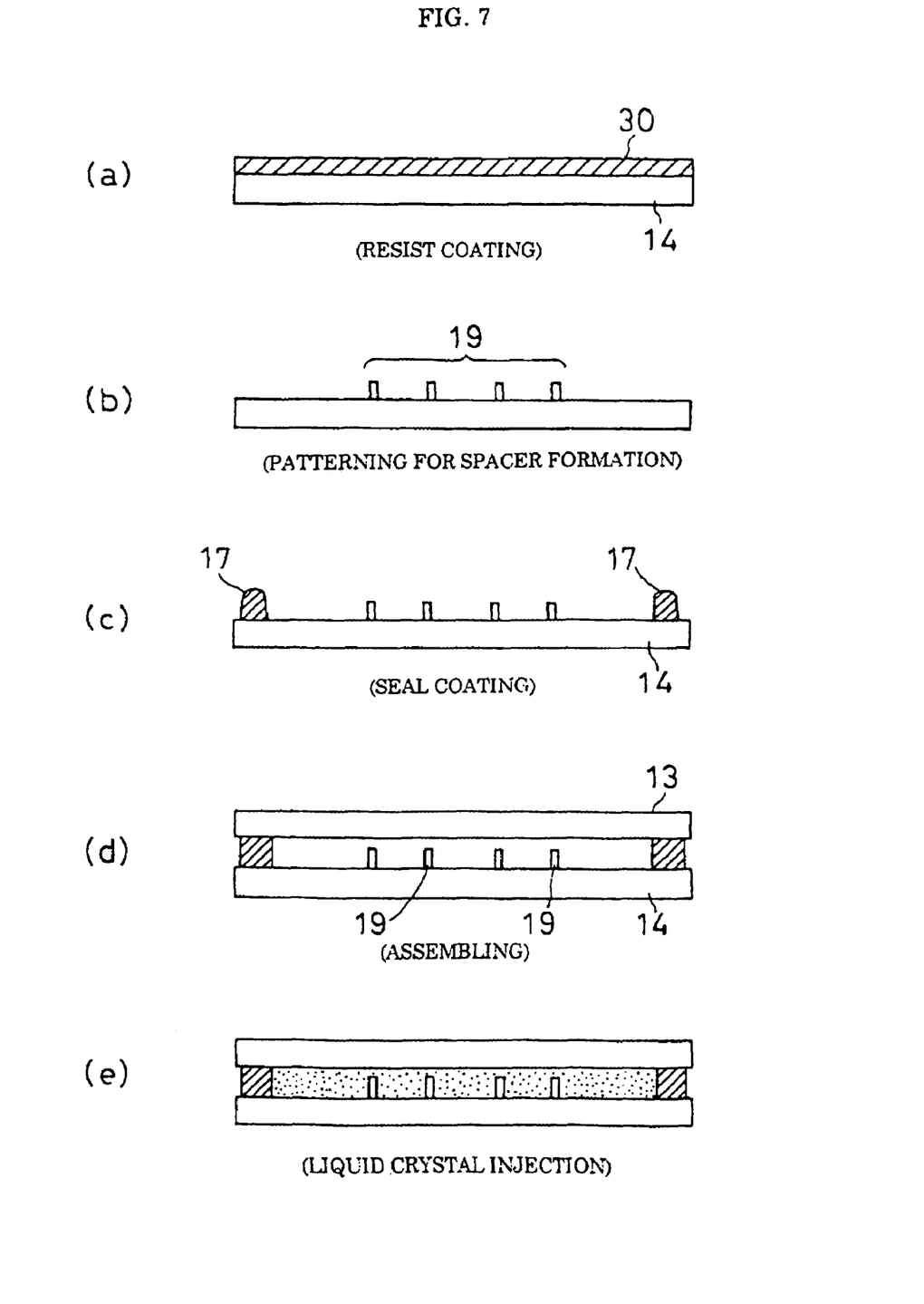
FIGS. 7a-e are views illustrating a manufacturing process of the touch sensor type liquid crystal display of the first embodiment.

The preferred embodiments of the present invention will be described with reference to the accompanying drawings wherein like numerals represent the same or similar elements throughout the Figs. A brief description of the reference numerals includes: 1 touch sensor type liquid crystal display, 2 liquid crystal display panel, 3 touch sensor panel, 4 fixed electrode plate, 5 movable electrode plate, 6 adhesive tape, 7 transparent conductive film, 8 transparent conductive film, 9 grid, 10 electrode terminal, 11 flexible substrate, 12 upper polarizing plate, 13 color filter substrate, 14 array substrate, 15 lower polarizing plate, 16 reflecting plate, 17 sealing material, 18 liquid crystal layer, 19 gap controlling spacer (spacer), 20 pen, 21 ultraviolet curing resin, 131 black matrix, 132 color filter, 133 protective film, 134 common electrode, 135 orientation film, 141 under coated layer, 142 gate insulating film, 143 pixel electrode, 144-1 to 144-2 gate line, 145 thin film transistor, 146 orientation film FIG. 1 is a section of a touch sensor type liquid crystal display according to a first embodiment of the present invention; FIG. 2 is a detailed sectional view thereof; FIG. 3 is a view illustrating an arrangement of a gap controlling spacer for a single pixel; FIG. 4 is a view illustrating an arrangement of the gap controlling spacer; FIG. 5 is a sectional view showing a state of touching a touch sensor panel; FIG. 6 is a perspective view showing a constitution of the touch sensor panel; and FIG. 7 is a view illustrating a manufacturing process of the touch sensor type liquid crystal display of the first embodiment. In FIGS. 1 to 7, the same elements as the elements in the conventional touch sensor type liquid crystal display of FIG. 13 are indicated by the same reference numerals.

As shown in FIG. 1, a touch sensor type liquid crystal display 1 of the present invention is constructed by laminating a touch sensor panel 3 on a liquid crystal display panel 2.

The liquid crystal display panel 2 has a structure, which is made by laminating an upper polarizing plate 12, a color filter substrate 13, an array substrate 14, a lower polarizing plate 15 and a backlight unit 16 from the upper part of the drawing. Peripheral parts of the color filter substrate 13 and the array substrate 14 are sealed with a sealing material 17, and a liquid crystal material is sealed in a space thereby formed to form a liquid crystal layer 18. Columnar spacers are provided in this space.

The touch sensor panel 3 is laminated on the liquid crystal display panel 2 by an adhesive tape 6. The touch sensor panel 3 includes a fixed electrode plate 4, and a movable electrode plate 5 arranged oppositely to the fixed electrode plate 4 at a specified interval by using the adhesive tape 6. A transparent conductive film 7 made of ITO (indium tin oxide), $SnO_2$ or the like is formed on the surface of the fixed electrode plate 4, and a similar transparent conductive film 8 is formed on the surface of the movable electrode plate 5. A grid 9 is disposed between the fixed and movable electrode plates 4 and 5 to prevent unexpected contact therebetween.

On both ends of the fixed and movable electrode plates 4 and 5, electrode terminals 10 are pasted by silver or the like in directions orthogonal to each other. The wires of the electrode terminals 10 are collected at one place and connected to a flexible substrate 11.

As shown in FIG. 2, an under coated layer 141 is formed on a main surface of the array substrate 14, and a gate insulating film 142 is formed on the under coated layer 141. On the gate insulating film 142, a pixel electrode 143 is formed to apply an electric field to the liquid crystal layer 18. In the gate insulating film 142, gate electrode wires, so-called gate lines 144-1 and 144-2, are formed. Then, a gap controlling spacer 19 (simply referred to as a spacer 19, hereinafter) made of an insulating material is formed on the gate line 144-1 to maintain a gap, i.e., a cell gap, between the array substrate 14 and the color filter substrate 13.

The spacer 19 is formed on the array substrate 14 to restrict a spacer movement in a planar direction, and brought into surface-contact with the color filter substrate 13 because of its square columnar shape. Accordingly, even if a force is applied to the liquid crystal display panel 2, a possibility of damaging an orientation film 135 and a common electrode 134 on the color filter substrate 13 will be extremely small. There should be no particular limitation placed on a shape of the spacer 19. Other than the square columnar shape, a polygonal columnar shape such as a cylindrical shape, a triangle pole shape or the like can be used as long as it can function as a spacer for the present invention.

To be formed on the gate line 144-1 as in the case of the embodiment, a width of the spacer 19 is decided depending upon a width of the gate line 144-1. In this case, the spacer 19 is present in a black matrix 131 region as described later. Thus, a width of the spacer 19 may be decided depending upon a width of the black matrix 131. A height of the spacer 19 may be decided depending upon a thickness of the liquid crystal layer 18. Preferably, the height should be set in a range of 3 to 7 µm, especially in a range of 4 to 6 µm.

On the main surface of the color filter substrate 13, black matrices 131 are formed in positions opposite the gate lines 144-1 and 144-2 and a thin film transistor 145. Further, color filters 132 are formed in positions adjacent to the black matrices 131 and not opposite the gate lines 144-1 and 144-2, and so on. On the black matrices 131 and the color filters 132, a common electrode 134 is formed by including a protective film 133.

On the main surface of the array substrate 14, orientation films 146 made of polyimide are formed for the purpose of orienting a liquid crystal so as to cover the thin film transistor 145 and the pixel electrodes 143. Likewise, on the color filter substrate 13, an orientation film 135 is formed on the common electrode 134. An orientation film 146 is also formed on a side face of the spacer 19.

With the touch sensor type liquid crystal display 1, the spacer 19 is formed on the gate line 144-1 of the array substrate 14, in other words, in the black matrix 131 region of the color filter substrate 13. Thus, even if application of an excessive force to the liquid crystal display panel 2 causes an upper end surface of the spacer 19 to damage the orientation film 135 and the common electrode 134 on the color filter substrate 13, since these parts are adhesive or black matrices 131 which are not displayed as images, no deterioration will occur in image performance of the liquid crystal display panel 2. If the spacer 19 is formed in a region where the thin film transistor 145 and the color filter 132 are present other than the black matrix 131, the thin film transistor 145 or the color filter 132 will not be able to function satisfactorily. Therefore, in the present invention, the spacer 19 should preferably be formed in the black matrix 131 region. However, the present invention will not eliminate a possibility of forming the spacer 19 in a region other than the black matrix 131 region, for instance, in the region of the color filter 132.

Positions of arranging the spacer 19 and the grid 9 of the touch sensor panel 3 are coincident with each other. Thus, when the surface of the touch sensor panel 3 is touched, a pressing force generated by this touching is received by the grid and, by further receiving the pressing force by the spacer 19, unexpected bending of the liquid crystal display panel can be controlled. It should be understood, however, that coincidence in the arranging positions between the spacer 19 and the touch sensor panel 3 does not mean one-to-one correspondence between all the spacers 19 and the grids 9. In other words, the number of spacers 19 and the number of grids 9 are not always coincident with each other. There may be a case where the number of spacers 19 is larger than that of grids 9, or vice versa. Thus, no one-to-one correspondence is established between the spacers 19 and the grids 9. Desirable setting for strength is that the number of spacers 19 is larger than that of grids 9, and arranging positions of the grids 9 and the spacers 19 coincide with each other, because all the pressing forces from the grids 9 are received by the spacers 19. Another effective setting may be that not only arranging positions of the grids 9 and the spacers 19 are completely coincident with each other, but also the grids 9 are present in regions in the vicinity, for instance, in the regions having sectional areas 3 to 5 times larger than those of the spacers 19.

FIG. 3 is an expanded view showing one pixel in the liquid crystal display panel 2. The spacer 19 is formed in a position adjacent to the thin film transistor 145. FIG. 4 is a view showing an arrangement of spacers 19 in the liquid crystal display panel 3 (only a part is shown). Positions for forming the spacers 19 are circled. Since the spacers 19 are uniformly arranged in accordance with the embodiment, it is possible to control bending of the color filter substrate 13 or the array substrate 14 irrespective of a place of the liquid crystal display panel 2 when the touch sensor panel 3 is touched.

An operation of the touch sensor type liquid crystal display 1 thus constructed is conducted as follows. Specifically, as shown in FIGS. 5 and 6, when the surface of the touch sensor panel 3 is pressed by a pen 20, the movable electrode plate 5 is partially bent to be brought into contact with the fixed electrode plate 4. As shown in FIG. 5, a point of contact is a point for distributing voltages applied to the electrode terminals 10 respectively formed in the fixed and movable electrode plates 4 and 5, and voltage reductions of these plates are measured by opposing electrodes. By using a processing circuit including an A/D converter to process the amounts of these voltage reductions, a coordinate of the point of contact can be obtained.

Next, a method for forming spacers 19 will be described by referring to FIG. 7.

First, in a resist coating step of FIG. 7(a), an ultraviolet curing resin 30 made of an photosensitive acrylic resin is coated (resist-coated) on the array substrate 14 having the pixel electrodes formed thereon to have a thickness of about 5 microns (resist coating). Depending upon a structure or the like of the color filter substrate, a polyimide resin may be used instead of the acrylic resin.

Then, the process moves to a patterning step of forming spacers 19 shown in FIG. 7(b). In this patterning step, first, ultraviolet-ray exposure is performed by using a photomask. This ultraviolet-ray exposure causes a negative development, in other words, a place irradiated with a light to be cured. Accordingly, a basic structure of each of spacers 19 is obtained. Needless to say, a basic structure can also be obtained by performing the ultraviolet-ray exposure to cause a positive development. Subsequently, an uncured portion is removed by means of an alkali phenomenon, the array substrate 14 is washed by water and dried, and then a resin cured at about 230° C. is burned thereto. By this burning, the resin for forming the spacer 19 is sufficiently cured.

After the end of the burning, an orientation film is coated. The coating of the orientation film should be carried out at this stage, because there is a possibility that formation of the spacer 19 after the orientation film is formed will disturb orientation.

Then, the process moves to a step of coating a sealing material 17 shown in FIG. 7(c). In accordance with the embodiment, a sealing material 17 using a thermosetting resin made of an epoxy resin is formed like a frame in a peripheral part of the array substrate 14. This sealing material 17 is coated to have a slightly larger height than that of a necessary cell gap by using, for instance, a dispenser system. At this stage, a liquid crystal injection port must be provided for injecting a liquid crystal.

Then, the process moves to an assembling step of FIG. 7(d). In this assembling step, the color filter substrate 13 formed up to the orientation film is pressed to the array substrate 14 having the spacers 19 and the sealing material 17 formed thereon, and these two substrates are firmly fixed to each other. More specifically, after the color filter substrate 13 is pressed, a load is applied according to a substrate dimension. For example, in the case of a substrate of 360 mm~460 mm, a load slightly lower than 1 t is applied, and then heating is performed at about 150° C. This heating melts and gelatinizes the sealing material 17. Then, a contained curing material causes curing reaction to form a cured resin. In this way, the sealing material 17 is firmly fixed to the color filter substrate 13, and the color filter substrate 13 and the array substrate 14 are jointed to each other while a cell gap, i.e., a gap decided by the spacer 19, is maintained.

Lastly, the process moves to a step of injecting a liquid crystal material shown in FIG. 7(e). First, a hermetically sealed region formed by the sealing material 17 is placed in a vacuum state, and then a liquid crystal material is injected through the liquid crystal material injection port. The injected liquid crystal material can be sufficiently spread in the hermetically sealed region, as it has low viscosity. Then, a series of steps come to an end after sealing the liquid crystal injection port with a sealing material.

Figure 8:
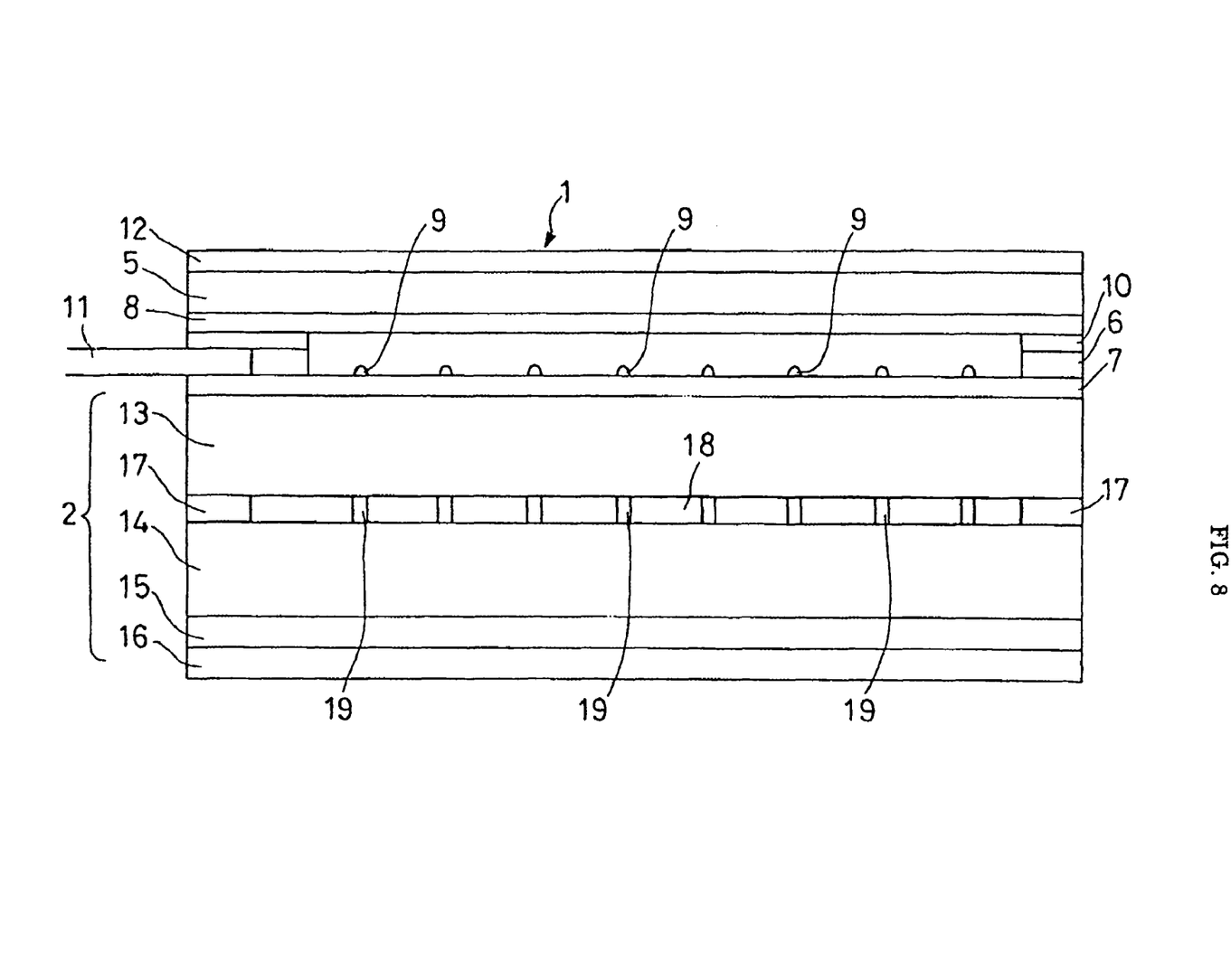
FIG. 8 is a constitutional view showing in section a touch sensor type liquid crystal display according to a second embodiment of the invention.
Figure 9:
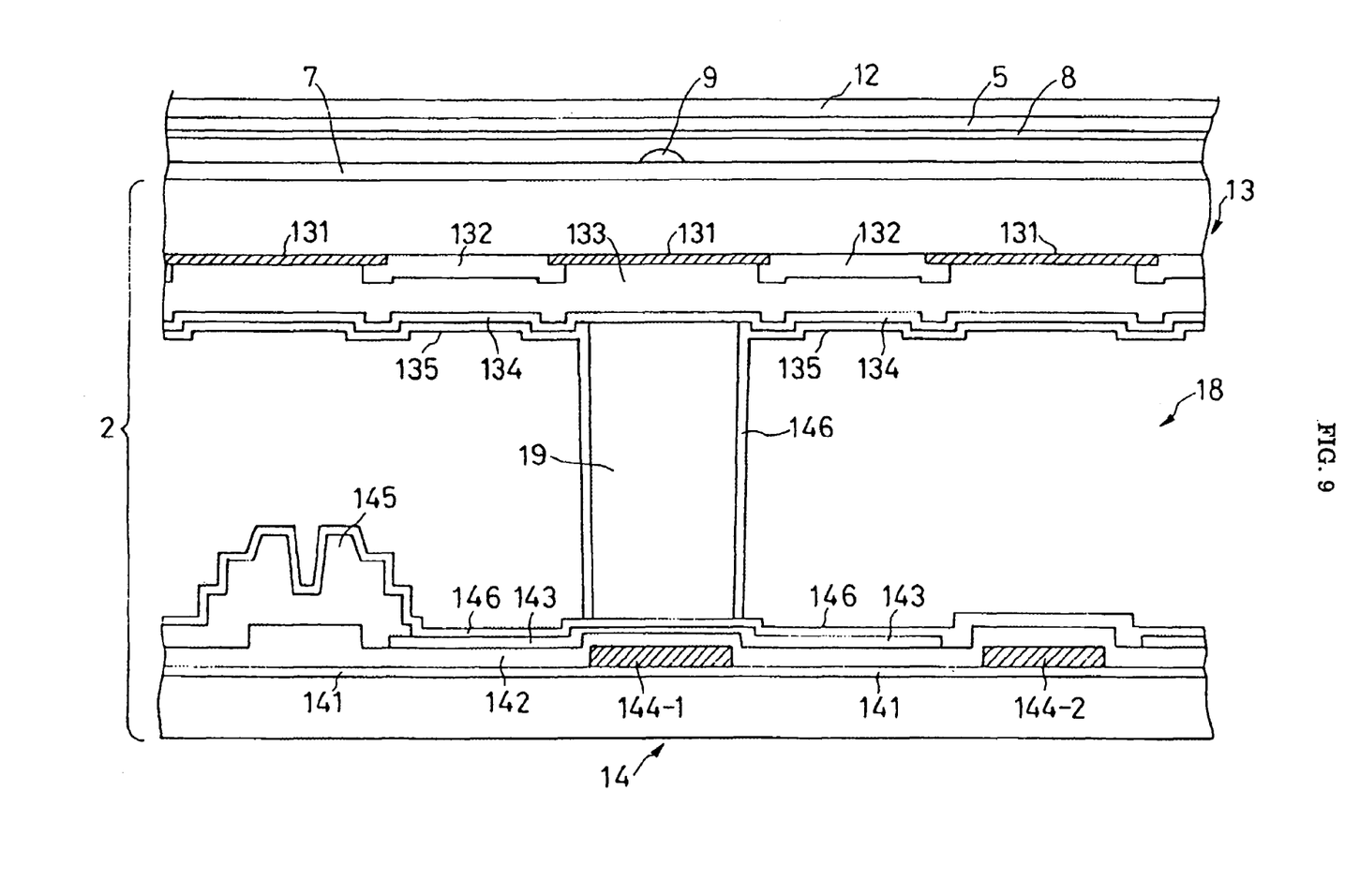
FIG. 9 is a detailed sectional view showing the touch sensor type liquid crystal display of the second embodiment.
Figure 10:
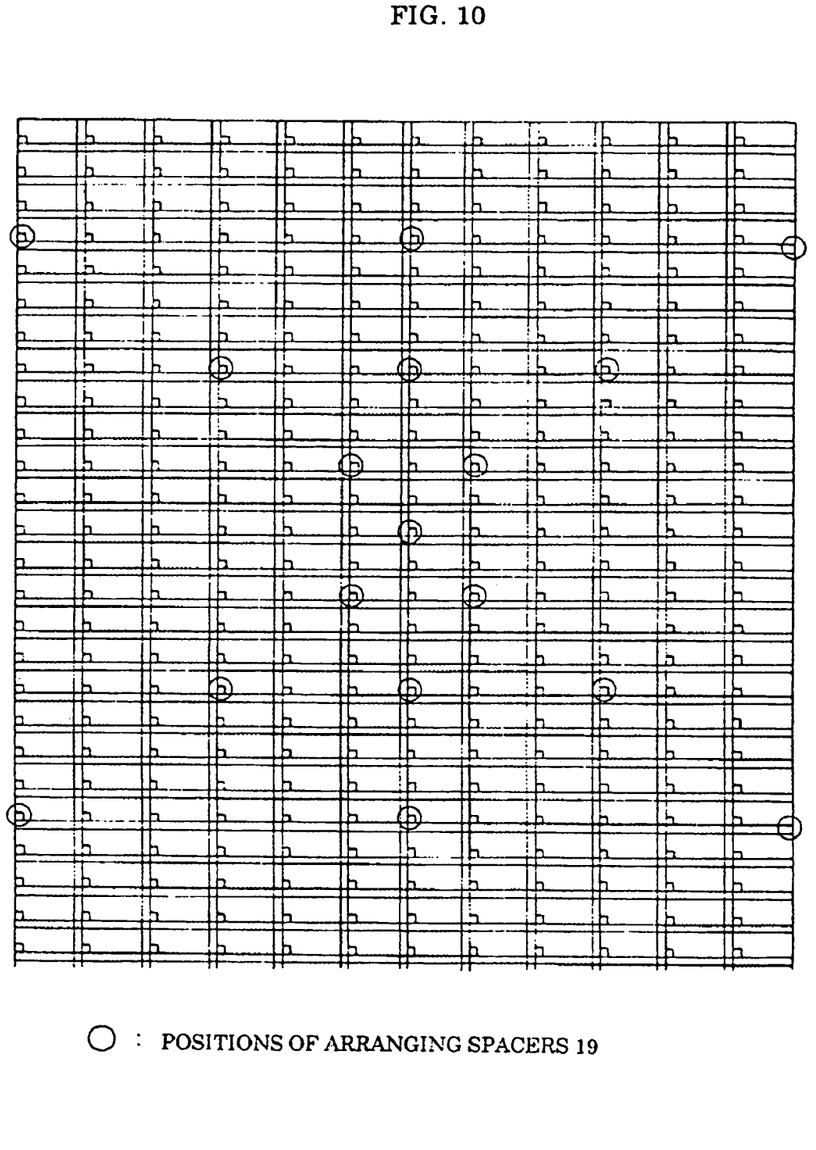
FIG. 10 is a view illustrating an arrangement of a gap controlling spacer in a liquid crystal display panel according to the second embodiment.

FIG. 8 is a sectional view showing in section a touch sensor type liquid crystal display according to a second embodiment of the present invention; FIG. 9 is a detailed sectional view thereof; and FIG. 10 is a view illustrating an arrangement of a gap controlling spacer. In FIGS. 8 to 10, the same elements as the elements of the first embodiment are indicated by the same reference numerals.

Prior to description of the second embodiment, main differences between the first and second embodiments will be explained. First, in the first embodiment, the liquid crystal display panel and the touch sensor panel are provided independently of each other, although these are laminated together. On the other hand, in the second embodiment, the fixed electrode plate constituting the touch sensor panel is abolished by utilizing a color filter substrate of a liquid crystal display panel as a fixed electrode plate for a touch sensor. Secondly, in the first embodiment, the spacers are formed on the array substrate. In the second embodiment, however, spacers are formed on the color filter substrate. Thirdly, in the first embodiment, the spacers are uniformly arranged. In the second embodiment, however, a density of arranging spacers is higher toward a center of the liquid crystal display panel. The second embodiment will now be described based on these differences.

In FIG. 8, a liquid crystal display panel 2 includes an upper polarizing plate 12, a color filter substrate 13, an array substrate 14, a lower polarizing plate 15 and a backlight unit 16. The upper polarizing plate 12 is disposed on a movable electrode plate 5.

The color filter substrate 13 also functions as, for instance the fixed electrode plate 4 of the touch sensor shown in FIG. 1. Specifically, a transparent conductive film 7 made of ITO (indium tin oxide), $SnO_2$ or the like is formed on the upper surface of the color filter substrate 13 and formed on its upper surface. Being spaced by a specified amount from the color filter substrate 13 (fixed electrode plate 4), the movable electrode 5 having a transparent conductive film 8 is provided by an adhesive tape 6. Between the color filter substrate 13 (fixed electrode plate 4) and the movable electrode plate 5, grids 9 are formed to prevent unexpected contact therebetween.

As shown in FIG. 9, on a main surface of the color filter substrate 13 (fixed electrode plate 4), black matrices 131 are formed in positions opposite gate lines 144-1 and 144-2 and a thin film transistor 145. Also, color filters 132 are formed in positions adjacent to the black matrices 131 and not opposite the gate lines 144-1 and 144-2 or the like. A common electrode 134 is formed on the black matrices 131 and the color filters 132 by interpolating a protective film 133. Then, a spacer 19 is formed above the common electrode 134 in a position corresponding to each of the black matrices 131 to maintain a gap between the color filter substrate 13 (fixed electrode substrate 4) and the array substrate 14.

This spacer 19 is fixed to the color filter substrate 13, and brought into surface-contact with the array substrate 14 having a square columnar shape. Accordingly, even if a force is applied to the liquid crystal display panel 2, a possibility of damaging an orientation film 146 and a pixel electrode 143 on the array substrate 14 will be extremely small. It should be noted that a shape of the spacer 19 should not be limited to a square columnar shape as in the case of the first embodiment. For a dimension of the spacer 19, the specifications described above with reference to the first embodiment can apply.

With the touch sensor type liquid crystal display 1 constructed in the foregoing manner, since the spacer 19 takes the same position as that in the case of the first embodiment when seen from a plane, the second embodiment provides the same effects as those provided by the first. A positional relationship between the spacers 19 and the grids 9 is also the same. In the second embodiment, however, since the fixed electrode plate 4 can be abolished by utilizing the color filter substrate 13 as the fixed electrode plate 4 for the touch sensor instead, a thickness and weight of the touch sensor type liquid crystal display can be reduced. Moreover, the abolition of the fixed electrode plate 4 is effective for preventing deterioration of an optical characteristic.

With the touch sensor type liquid crystal display 1 of the second embodiment, as shown in FIG. 10, a density of spacers 19 is higher toward a center of the liquid crystal display panel 2 (only a part is shown). There is a structural reason for this higher density. Specifically, the amount of bending is larger toward the center of the liquid crystal display panel when the touch sensor is touched and, hence, to deal with the bending, more spacers 19 are disposed in the center having a larger bending amount.

Other constitutional elements and a manufacturing method of the second embodiment are the same as those of the first embodiment, and thus description thereof will be omitted.

In the first and second embodiments that have been described, the liquid crystal material is driven by using the thin film transistor based on the active matrix system. Driving can also be performed by using other systems such as a direct driving system and a beam address system. Color displaying is performed by using the color filter in the first and second embodiments. Instead of using the color filter, however, a two-color pigment can be contained in the liquid crystal material.

In the first embodiment, the PET film is used for the fixed electrode plate 4. Glass can be used instead, depending on a specific purpose. In the case of using the glass, however, weight-reduction and thinning of the touch sensor type liquid crystal display may not be sufficient. Thus, a flexible material such as a PET film should preferably be used.

Figure 11:
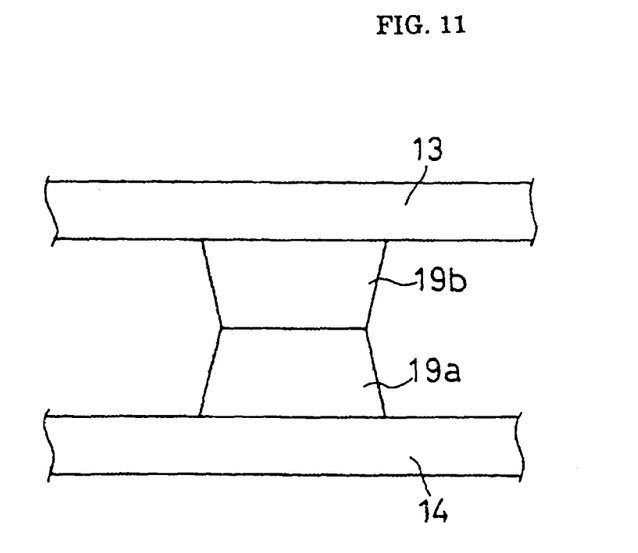
FIG. 11 is a view showing another form of a gap controlling spacer.

The spacers 19 are formed on the array substrate 14 in the first embodiment, and the spacers 19 are formed on the color filter substrate 13 in the second embodiment. But spacers 19 can be formed on both sides of the array and color filter substrates 14 and 13. In this case, care must be taken to make a sum total of heights of the spacers formed on the array and color filter substrates 14 and 13 coincident with a gap, i.e., a cell gap, between these substrates. For example, as shown in FIG. 11, each height of spacers 19a and 19b respectively formed on the array and color filter substrates 14 and 13 is set to be ½ of a cell gap. In this case, since the spacers 19a and 19b are respectively fixed to the array and color filter substrates 14 and 13, even if a load is applied in a planar direction, only contact surfaces of the spacers 19a and 19b are rubbed by each other. Accordingly, any damage can be prevented from being given to the array and color filter substrates 14 and 13.

Figure 12:
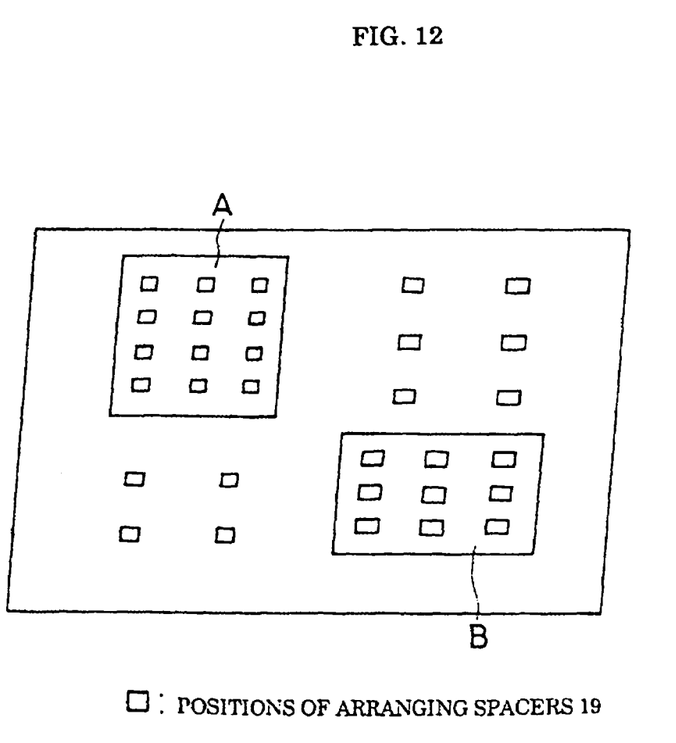
FIG. 12 is a view showing another arrangement of the gap controlling spacer.

The spacers are uniformly arranged in the first embodiment, and a density of the spacers is larger toward the center of the liquid crystal display panel in the second embodiment. As an example of regularly arranging spacers, an arrangement like that shown in FIG. 12 is included in the embodiment of the present invention. Specifically, in the case of the touch sensor type liquid crystal display where regions indicated by A and B in FIG. 12 are touched more frequently than other regions, it is effective to set densities of spacers 19 to be higher in the regions A and B than that in other regions. The first and second embodiments have been described by taking an example of the device of the type including the backlight arranged in the backside of the liquid crystal display panel. But the embodiments can also be applied to a device of a reflection type including a film of a high reflectance arranged in the backside. In this case, the film having a high reflectance should be arranged in a portion where the backlight unit 16 is arranged.

As apparent from the foregoing, the present invention provides the touch sensor type liquid crystal display, which can endure long-time use by achieving a weight reduction, and preventing deterioration of an image characteristic of the liquid crystal display panel.

Having described preferred embodiments of a touch sensor type liquid crystal display, and liquid crystal display (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A touch sensor type liquid crystal display comprising:
    a liquid crystal display panel having first and second substrates arranged oppositely to each other by a specified gap width;
    a touch sensor panel coupled to the liquid crystal display panel including fixed and movable electrode plates; and
    a plurality of spacers interposed between the first and second substrates to control the gap width between the first and second substrates,
    wherein each spacer comprises a first member fixedly formed on the first substrate and having a first contact surface, and a second member fixedly formed on the second substrate and having a second contact surface in contact with the first contact surface of the first member,
    wherein the first and second members are adapted to slide relative to each other along the first and second contact surfaces in response to a contact force while maintaining contact between the first and second contact surfaces to control the gap width.

2. The touch sensor type liquid crystal display according to claim 1, wherein said plurality of spacers are arranged in a uniform pattern in a planar direction of the liquid crystal display panel.

3. The touch sensor type liquid crystal display according to claim 1, wherein said plurality of spacers are arranged in a non-uniform pattern in a planar direction of the liquid crystal display panel, wherein the non-uniform pattern comprises at least a first pattern of spacers having a first arranged density and a second pattern of spacers having a second arranged density which is greater than the first arranged density.

4. The touch sensor type liquid crystal display according to claim 3, wherein second pattern of spacers is disposed in a center region of the liquid crystal display panel.

5. A liquid crystal display as defined in claim 1 wherein each of the first and second members of each spacer is columnar in shape.

6. A liquid crystal display as defined in claim 1 wherein the cross-section of each spacer parallel to the plane of a substrate is variable.

7. A touch sensor type liquid crystal display comprising:
a liquid crystal display panel having array and color filter substrates arranged oppositely to each other by a specified gap width;
a touch sensor panel coupled to the liquid crystal display panel including fixed and movable electrode plates;
a plurality of grids arranged between the fixed and movable electrode plates; and
a plurality of spacers interposed between the array substrate and the color substrate to control the gap width between the array and color filter substrates,
wherein the spacers are arranged to be coincident with the grids, and
wherein each spacer comprises a first member fixedly formed on the array substrate and having a first contact surface, and a second member fixedly formed on the color substrate and having a second contact surface in contact with the first contact surface of the first member, wherein the first and second members are adapted to slide relative to each other along the first and second contact surfaces in response to a contact force while maintaining contact between the first and second contact surfaces to control the gap width.

8. The touch sensor type liquid crystal display according to claim 7, said display being constructed by laminating together said liquid crystal display panel having the array and color filter substrates arranged oppositely to each other by interpolating a liquid crystal layer, and a touch sensor panel having the movable and fixed electrode plates arranged oppositely to each other by a specified second gap width.

9. The touch sensor type liquid crystal display according to claim 8, wherein said movable and fixed electrode plates are made of plastic films.

10. The touch sensor type liquid crystal display according to claim 7, wherein said array and color filter substrates of the liquid crystal display panel are arranged oppositely to each other by interpolating a liquid crystal layer, said movable electrode plate serves as a touch sensor arranged oppositely to the color filter substrate by a specified third gap width and a conductive film is provided to serve as a touch sensor formed on a surface opposite the movable electrode plate.

11. The touch sensor type liquid crystal display according to claim 10, wherein said movable electrode plate is made of a plastic film.

12. A touch sensor type liquid crystal display comprising:
a liquid crystal display panel having first and second substrates arranged oppositely to each other by a specified gap width;
a touch sensor panel coupled to the liquid crystal display panel including fixed and movable electrode plates; and
a plurality of spacers interposed between the first and second substrates to control the gap width between the first and second substrates,
wherein each spacer comprises a first member fixedly formed on the first substrate and having a first contact surface, and a second member fixedly formed on the second substrate and having a second contact surface in contact with the first contact surface of the first member,
wherein the first and second members are adapted to slide relative to each other along the first and second contact surfaces in response to a contact force while maintaining contact between the first and second contact surfaces to control the gap width, and
wherein said spacers are arranged in a black matrix region of the liquid crystal display panel.

13. A touch sensor type liquid crystal display comprising:
a liquid crystal display panel having first and second substrates arranged oppositely to each other by a specified gap width; and
a plurality of spacers interposed between the first and second substrates to control the gap width between the first and second substrates,
wherein each spacer comprises a first member fixedly formed on the first substrate and having a first contact surface, and a second member fixedly formed on the second substrate and having a second contact surface in contact with the first contact surface of the first member,
wherein the first and second members are adapted to slide relative to each other along the first and second contact surfaces in response to a contact force while maintaining contact between the first and second contact surfaces to control the gap width; and
wherein arranged densities of said spacers are not uniform.

14. The liquid crystal display according to claim 13, wherein an arranged density of said spacers is high in a center of the liquid crystal display panel.

15. A liquid crystal display as defined in claim 13 wherein each of the first and second members of each spacer is columnar in shape.

16. A liquid crystal display as defined in claim 13 wherein an arranged density of said spacers is greater in a center of the liquid crystal display panel.

* * * * *